United States Patent
Ponnuswamy et al.

(10) Patent No.: US 8,675,547 B2
(45) Date of Patent: Mar. 18, 2014

(54) WIRELESS LINK MONITORING AND ACTIVE TROUBLESHOOTING

(75) Inventors: Subbu Ponnuswamy, Scotts Valley, CA (US); Pradeep Iyer, San Jose, CA (US)

(73) Assignee: Aruba Networks, Inc., Sunnyvale, CA (US)

(*) Notice: Subject to any disclaimer, the term of this patent is extended or adjusted under 35 U.S.C. 154(b) by 1096 days.

(21) Appl. No.: 11/495,084

(22) Filed: Jul. 28, 2006

(65) Prior Publication Data

US 2008/0025259 A1 Jan. 31, 2008

(51) Int. Cl.
*H04W 4/00* (2009.01)

(52) U.S. Cl.
USPC ...... 370/328; 370/331; 370/216; 370/395.41; 370/330; 370/346; 455/404.2; 455/456.1; 455/515; 455/115.1; 455/440; 455/457

(58) Field of Classification Search
USPC ............... 370/331, 216, 395.41, 330, 346; 455/404.2, 456.1, 515, 115.1, 440, 457
See application file for complete search history.

(56) References Cited

U.S. PATENT DOCUMENTS

| | | | |
|---|---|---|---|
| 6,249,894 B1 * | 6/2001 | Lin et al. | 714/748 |
| 6,628,924 B1 * | 9/2003 | Miyamoto | 455/69 |
| 6,799,204 B1 * | 9/2004 | Baba et al. | 709/220 |
| 6,813,498 B1 * | 11/2004 | Durga et al. | 455/456.1 |
| 7,162,203 B1 * | 1/2007 | Brunner | 455/63.1 |
| 2004/0078151 A1 | 4/2004 | Aljadeff et al. | |
| 2005/0058081 A1 * | 3/2005 | Elliott | 370/252 |
| 2005/0190738 A1 * | 9/2005 | Smavatkul et al. | 370/346 |
| 2005/0268181 A1 * | 12/2005 | Murty et al. | 714/704 |
| 2006/0092016 A1 | 5/2006 | Modes et al. | |
| 2010/0271186 A1 | 10/2010 | Tanaka et al. | |
| 2012/0119880 A1 | 5/2012 | Ponnuswamy | |

OTHER PUBLICATIONS

U.S. Appl. No. 12/947,579, Non Final Office Action, mailed Nov. 15, 2012.

\* cited by examiner

*Primary Examiner* — Nimesh Patel
(74) *Attorney, Agent, or Firm* — Varun A. Shah (57) ABSTRACT

According to one embodiment of the invention, a method comprises transmitting a Layer 2 (L2) frame from a first wireless device. Upon receipt of a frame in response to the L2 frame, the first wireless device uses information conveyed in the frame to modify its functionality.

33 Claims, 9 Drawing Sheets

WIRELESS LINK MONITORING AND ACTIVE TROUBLESHOOTING

FIELD

Embodiments of the invention relate to the field of communications, and in particular, to a network and method for monitoring wireless links through the transmission of one or more Layer 2 (L2) frames from any wireless device to any wireless device.

GENERAL BACKGROUND

Over the last decade or so, many commercial and governmental entities have installed communication networks in order to allow their employees access to various network resources. To improve efficiency and to support mobility, many wireless access enhancements have been added to local, personal, and wide area networks. Based on these enhancements, Wireless Local Area Networks (WLANs), Personal Area Networks (PANs) and Wide Area Networks (WLANs) have been and continue to be utilized by more and more users.

For instance, a WLAN supports communications between a number of wireless devices without any required line of sight for such communications. In current network configurations, multiple Access Points (APs), base stations or a central coordinator are connected to a wired network, such as an Ethernet network for example, and each AP operates as a relay station by supporting communications between resources of the wired network and wireless stations (STAs). STAs are fixed or mobile wireless devices, where the mobile devices enable users to alter their physical locations, but still communicate over the network.

In accordance with many WLAN transmission schemes, including transmission schemes operating in accordance with any Institute of Electrical and Electronics Engineers (IEEE) 802.11 standard, each wireless device must acknowledge any directed frames within a prescribed period of time commonly referred to as a "Short Interframe Space" or "SIFS". This acknowledgement signaling occurs without verification of the content or source of the frame, and is merely used to confirm that the transmitted frame was successfully received so as to avoid unnecessary retransmissions.

One disadvantage associated with current WLANs is that the efficiency of these networks degrades as the number of wireless devices increase. Moreover, a substantial number of wireless devices may be incapable of initiating directed L2 unicast communications and only capable of responding to a communication initiated from another device or forwarding a communication from one device to another. However, L2 communications are valuable for gathering information concerning a particular wireless device and the quality of the wireless channel or link. Information gathered from L2 communications can be used to improve network security as well as overall performance. For instance, many conventional APs produced by other manufacturers are adapted to initiate broadcast transmissions, commonly referred to as "beacons," but are incapable of initiating L2 unicast communications to a STA.

Hence, it would be advantageous to develop a communication scheme that enables any wireless device to communicate with another wireless device, and to make use of the L2 acknowledgement signaling requirements described above.

BRIEF DESCRIPTION OF THE DRAWINGS

The invention may best be understood by referring to the following description and accompanying drawings that are used to illustrate embodiments of the invention.

DETAILED DESCRIPTION

Embodiments of the invention relate to a network and method for monitoring wireless links through the transmission of one or more Layer 2 (L2) frames from any wireless device to any wireless device. Such monitoring may be performed by the transmitting device, the receiving device or a third non-participating wireless device. No pre-established communications (e.g., association) is required before transmission of the L2 frame. As a result, any wireless device can transmit a L2 frame to any other wireless device within its range and may use information gathered from a return frame produced by the wireless device to better understand the state and location of that wireless device in efforts to optimize network performance and security.

According to one embodiment of the invention, a wireless link may be monitored by a first wireless device (e.g., access point "AP") transmitting a L2 frame to a second wireless device (e.g., wireless station "STA"). It is contemplated that a L2 frame may be a NULL-Data frame, although other types of L2, including data, control and management frames may be used. Furthermore, the second wireless device does not need to be associated with the first wireless device. According to another embodiment of the invention, the wireless link may be monitored by transmitting a NULL-Data frame from a first STA to a second STA in order to gather information concerning the second STA.

In summary, the wireless link may be monitored for communications between any wireless devices, including AP-to-STA and STA-to-STA as described above as well as AP-to-AP and STA-to-AP communications. Moreover, communications between an intermediary wireless device (e.g., a mesh or relay node) and either a STA, AP or another intermediary node may be monitored in accordance with the scope and spirit of the invention.

For these and other embodiments of the invention, a L2 frame is transmitted and a L2 Return frame from the receiving wireless device is received upon successful receipt of the L2 frame. In many cases, the L2 Return frame may be an Acknowledgement (ACK) frame sent within a prescribed time period after transmission of the L2 frame. This signaling protocol can be used in a variety of applications as described below.

Certain details are set forth below in order to provide a thorough understanding of various embodiments of the invention, albeit the invention may be practiced through many embodiments other than those illustrated. Well-known logic and operations are not set forth in detail in order to avoid unnecessarily obscuring this description.

Herein, a "wireless device" may be broadly construed as any device that supports wireless communications. For instance, one type of wireless device may operate as an AP while another type of wireless device may operate as a STA. Specific examples of wireless devices operating as APs or STAs include, but are not limited or restricted to servers, portable and desktop computers, VoIP phones, personal digital assistants "PDAs", customer premises equipment, or the like.

A "wireless link" may be broadly construed as a pathway that supports wireless communications between two wireless devices. The wireless communications are in accordance with a WLAN communication standard such as High Performance Radio LAN (HiperLan) or IEEE 802.11. Examples of different types of IEEE 802.11 standards include, but are not limited or restricted to (i) an IEEE 802.11b standard entitled "Wireless LAN Medium Access Control (MAC) and Physical Layer (PHY) specifications: Higher-Speed Physical Layer Extension in the 2.4 GHz Band" (IEEE 802.11b, 1999), (ii) an IEEE 802.11a standard entitled "Wireless LAN Medium Access Control (MAC) and Physical Layer (PHY) specifications: High-Speed Physical Layer in the 5 GHz Band" (IEEE 802.11a, 1999), (iii) a revised IEEE 802.11 standard "Wireless LAN Medium Access Control (MAC) and Physical Layer (PHY) specifications" (IEEE 802.11, 2003), or the like.

The wireless communications between two wireless devices are generally controlled by hardware or software such as an application, an applet, a routine or even one or more executable instructions stored in a storage medium. The hardware may include any data processing unit including an Application Specific Integrated Circuit (ASIC), a Field Programmable Gate Array (FPGA), or the like. Firmware is considered merely one type of software. The "storage medium" may include, but is not limited or restricted to a programmable electronic circuit, a semiconductor memory device, a volatile memory (e.g., random access memory, etc.), a non-volatile memory (e.g., read-only memory, flash memory, a hard drive, etc.), a portable memory device (e.g., floppy diskette, a compact disk "CD", digital versatile disc "DVD", a digital tape, a Universal Serial Bus "USB" flash drive), or the like.

A "frame" is information arranged in a selected format that is transmitted over a link. Examples of different frame types may include, but are not limited or restricted to Data, Management, or Control frames.

I. General Architecture

Figure 1:
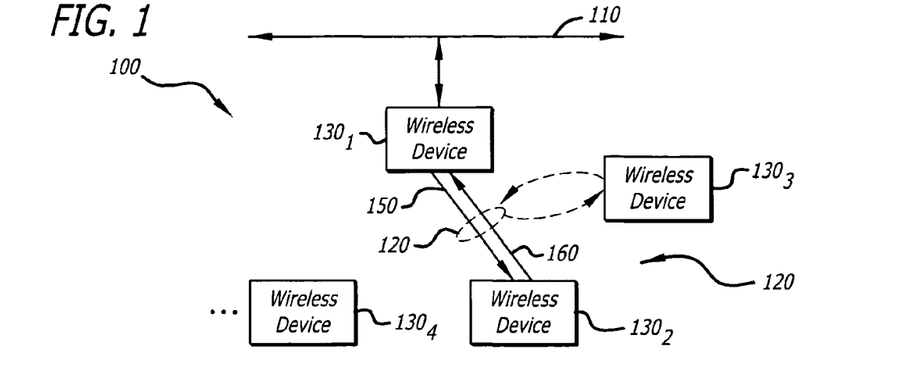
FIG. 1 is an exemplary embodiment of a wireless local area network in accordance with an embodiment of the invention.

Referring to FIG. 1, an exemplary embodiment of a network 100 is shown. In accordance with one embodiment of the invention, wireless network 100 is a wireless local area network (WLAN) that comprises a backbone (wired or wireless) network 110 in communication with a wireless network 120. Alternatively, network 100 may be deployed as a personal area network (PAN) or a wide area network (WAN).

Wireless network 120 comprises a plurality of wireless devices $130_1$-$130_N$ that are adapted to receive and/or transmit data. For this embodiment of the invention, wireless devices $130_1$-$130_N$ may include an access point (AP) $130_1$ and multiple wireless stations (STAS) $130_2$-$130_4$, where AP $130_1$ provides STAs $130_2$-$130_4$ access to resources on backbone network 110.

Figure 2:
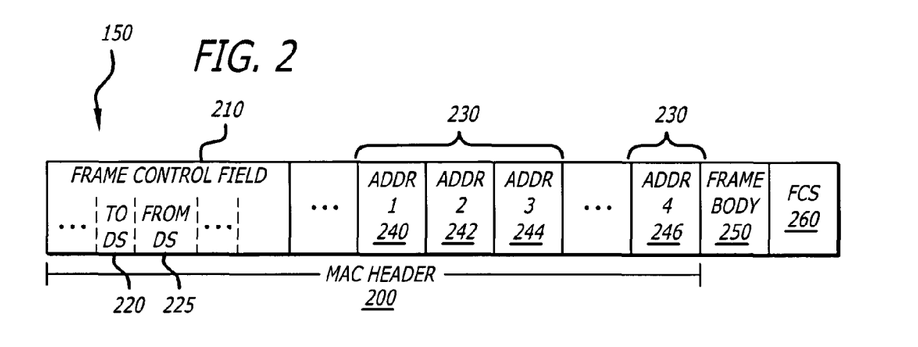
FIG. 2 is an exemplary embodiment of a Layer 2 (L2) frame transmitted by one wireless device to another in order to perform link monitoring.

As shown in detail, according to one embodiment of the invention, wireless device 130, transmits an L2 frame 150 to wireless device $130_2$ for link monitoring or active troubleshooting such as obtaining information concerning one of the devices. As shown in FIG. 2, consistent with the IEEE 802.11 standard, L2 frame 150 comprises a media access control (MAC) header 200, a frame body 250 and a frame check sequence (FCS) 260. FCS 260 is used to determine whether L2 frame 150 has been correctly received. Frame body 250 is a variable length field that contains information specific to individual frame types and subtypes in the form of information elements or data. Of course, where L2 frame 150 is a NULL-Data frame or a Control frame, frame body 250 is zero octets in size.

According to one embodiment of the invention, MAC header 200 comprises a frame control field 210 and a plurality of address fields 230. Frame control field 210 includes a "To DS" field 220 and a "From DS" field 225, which are used to identify an intended direction of L2 frame 150. "To DS" field 220 is a single bit that is set to a first logical value (e.g., logic "1") for data types transmitted from a STA to an AP. Otherwise, "To DS" field 220 is set to a second logical value (e.g., logic "0"). Similarly, "From DS" field 225 is a single bit that is set to the first logical value (e.g., logic "1") for data types transmitted from the AP. Otherwise, "From DS" field 225 is set to the second logical value (e.g., logic "0").

Figure 3A:
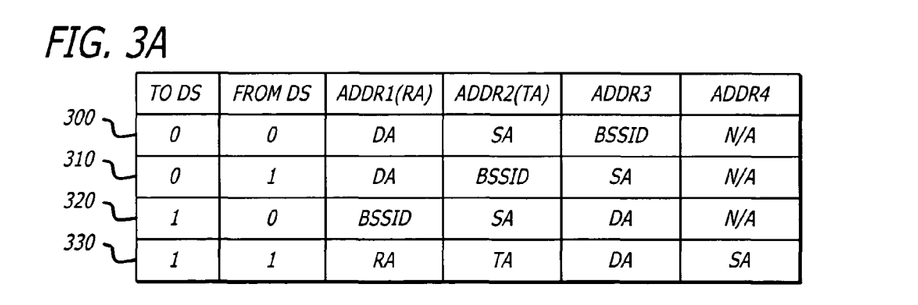
FIG. 3A is an exemplary embodiment of address and control information loaded into the data or management frame of FIG. 2 for link monitoring.

Therefore, as illustrated in FIG. 3A, for a first entry 300, transmissions between STAs, both "To DS" field 220 and "From DS" field 225 are set to the second logical value. For transmissions from an AP to STA, "To DS" field 220 is set to the second logical value and "From DS" field 225 is set to the first logical value as set forth in entry 310. For transmissions from a STA to an AP as illustrated in entry 320, "To DS" field 220 is set to the first logical value and "From DS" field 225 is set to the second logical value. Finally, as shown in entry 330, transmissions to an intermediary wireless device such as a mesh or relay node that receives and forwards an incoming frame, both "To DS" field 220 and "From DS" field 225 are set to the first logical value.

Address fields 230 comprise four (4) address fields, namely a first address field 240, a second address field 242, a third address field 244, and a fourth address field 246. The contents of address fields 230 are shown in detail in FIG. 3A, where such content is also dependent on the intended direction of L2 frame 150. Normally, the receiving wireless device utilizes the address within second address field 242 as the destination address for an acknowledgement (ACK) frame if an ACK frame is necessary.

For instance, where L2 frame 150 is exchanged between STAs ("To DS" field 220 and "From DS" field 225="0"), fourth address field 246 is not utilized. However, address fields 240, 242 and 244 are configured to include a destination address (DA), a source address (SA) and a Basic Service Set Identifier (BSSID). In general, the address "DA" is the destination of the L2 frame while the address "SA" is the address of the wireless device transmitting the L2 frame. "BSSID" may be (i) an address currently in use by the wireless device when an AP or associated with an AP, or (ii) an identifier of an Independent Basic Service Set (IBSS) that the wireless device belongs to, or (iii) a specific identifier for a particular frame type.

As another exemplary embodiment, where L2 frame 150 is sent to an intermediary device for forwarding to another device ("To DS" field 220 and "From DS" field 225="1"), address fields 240, 242, 244 and 246 are configured to include a receiver address (RA), a transmitter address (TA), a destination address (DA) and a source address (SA), respectively. In general, "RA" is an address of the wireless device that is the next immediate intended recipient of L2 frame 150 of FIG. 1. "TA" is the address of the wireless device that is transmitting L2 frame 150. Also, "DA" is the intended destination of L2 frame 150 while the address "SA" is the address of the wireless device initiating transmission of L2 frame 150.

Figure 3B:
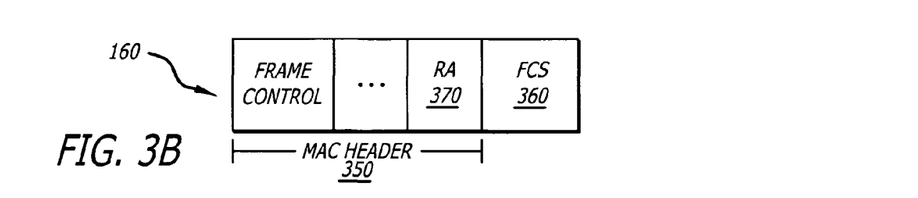
FIG. 3B is an exemplary embodiment of a L2 Return frame received in response to the L2 frame of FIG. 2.

Returning back to FIG. 1, in response to receiving L2 frame 150, wireless device $130_2$ transmits an L2 Return frame 160 to wireless device $130_1$. According to one embodiment of the invention and as further shown in FIG. 3B, L2 Return frame 160 is an ACK frame that includes a MAC header 350 and a FCS 360. The ACK frame has no frame body for data transfer. MAC header 350 includes a receiving address (RA) 370 that is adapted to include the contents of address field 242 of L2 frame 150 (see FIG. 2) and is used as a destination address for ACK frame 160.

It is contemplated that other wireless devices, such as wireless device $130_3$, may be within range to detect L2 frame 150 and L2 Return frame 160 during transmission. Wireless device $130_3$ may monitor wireless link 140 created by these unicast communications to obtain information concerning both wireless devices $130_1$ and $130_2$. For instance, based on the signal strength of L2 frame 150 and L2 Return frame 160, wireless device $130_3$ may be able to triangulate locations of wireless devices $130_1$ and $130_2$, respectively.

According to another embodiment of the invention, when a control frame is used as L2 frame 150, MAC header 200 comprises frame control field 210 and one or more address fields 250. Frame control field 210 includes a "To DS" field 220 and a "From DS" field 225 as described above, but the values of these fields 220 and 225 is set to second logical value (e.g., logic "0").

Figure 4A:
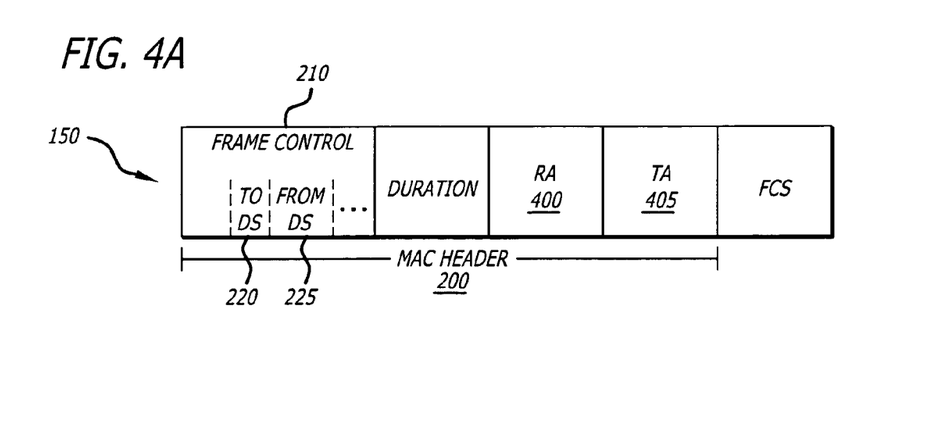
FIG. 4A is an exemplary embodiment of a L2 frame being a Return-to-Send (RTS) Control frame for link monitoring.

As shown in FIG. 4A, with respect to L2 frame 150 being a Return To Send (RTS) frame, MAC header 200 comprises frame control field 210, a receiver address (RA) 400, and a transmitter address (TA) 405. In general, RA 400 includes the address of the wireless device intended to receive L2 frame 150 and TA 405 is the address of the wireless device that is transmitting L2 frame 150.

Figure 4B:
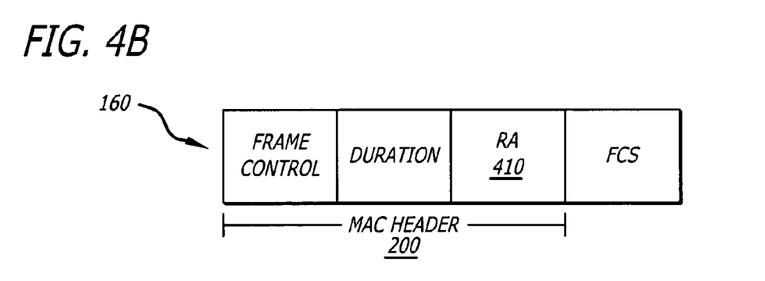
FIG. 4B is an exemplary embodiment of a L2 Return frame being a Clear-to-Send (CTS) Control frame for link monitoring.

In response to receiving L2 frame 150, as shown in FIG. 1, wireless device $130_2$ transmits L2 Return frame 160 to wireless device $130_1$. According to this embodiment of the invention and as further shown in FIG. 4B, L2 Return frame 160 is a Clear To Send (CTS) frame that includes a receiver address (RA) 410 that includes the contents of TA field 405 of L2 frame 150 (see FIG. 4A) and is used as a destination address for the CTS frame.

Figure 4C:
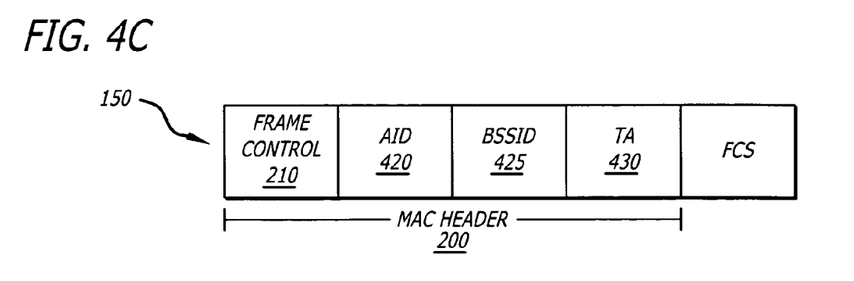
FIG. 4C is an exemplary embodiment of a L2 frame being a Power-Save (PS) Poll Control frame for link monitoring.

Furthermore, according to another embodiment of the invention, as shown in FIG. 4C, with respect to L2 frame 150 being a Power-Save Poll (PS-Poll) frame, MAC header 200 comprises frame control field 210, AID field 420, a BSSID field 425, and a transmitter address (TA) field 430. Similar in operation as describe above, upon receipt of L2 frame 150, wireless device $130_2$ transmits L2 Return frame 160 to wireless device $130_1$. According to this embodiment of the invention and as further shown in FIG. 3B, L2 Return frame 160 is an ACK frame that includes the contents of TA field 430 of L2 frame with RA field 370.

It is contemplated that L2 frame 150 and L2 Return frame 160 may be an exchange of any type data or control frame, provided the transmission of L2 frame 150 causes a required transmission of L2 Return frame 160.

II. General Applications of Link Monitoring

As described above, link monitoring enables any wireless device, namely APs or STAs or a mesh or relay node, to transmit a L2 frame to any other wireless device in order to receive information in response to the L2 frame. This information may be an ACK frame in accordance with the IEEE 802.11 standard or another type of response signal in accordance with HiperLan or other communication schemes. There is no requirement that the wireless device needs to be associated to the transmitting device. Moreover, there is no requirement that this link monitoring needs to be conducted using the current operating channel utilized by the transmitting wireless device, but rather, can be conducted over other wireless channels.

A. Location Tracking

Figure 5:
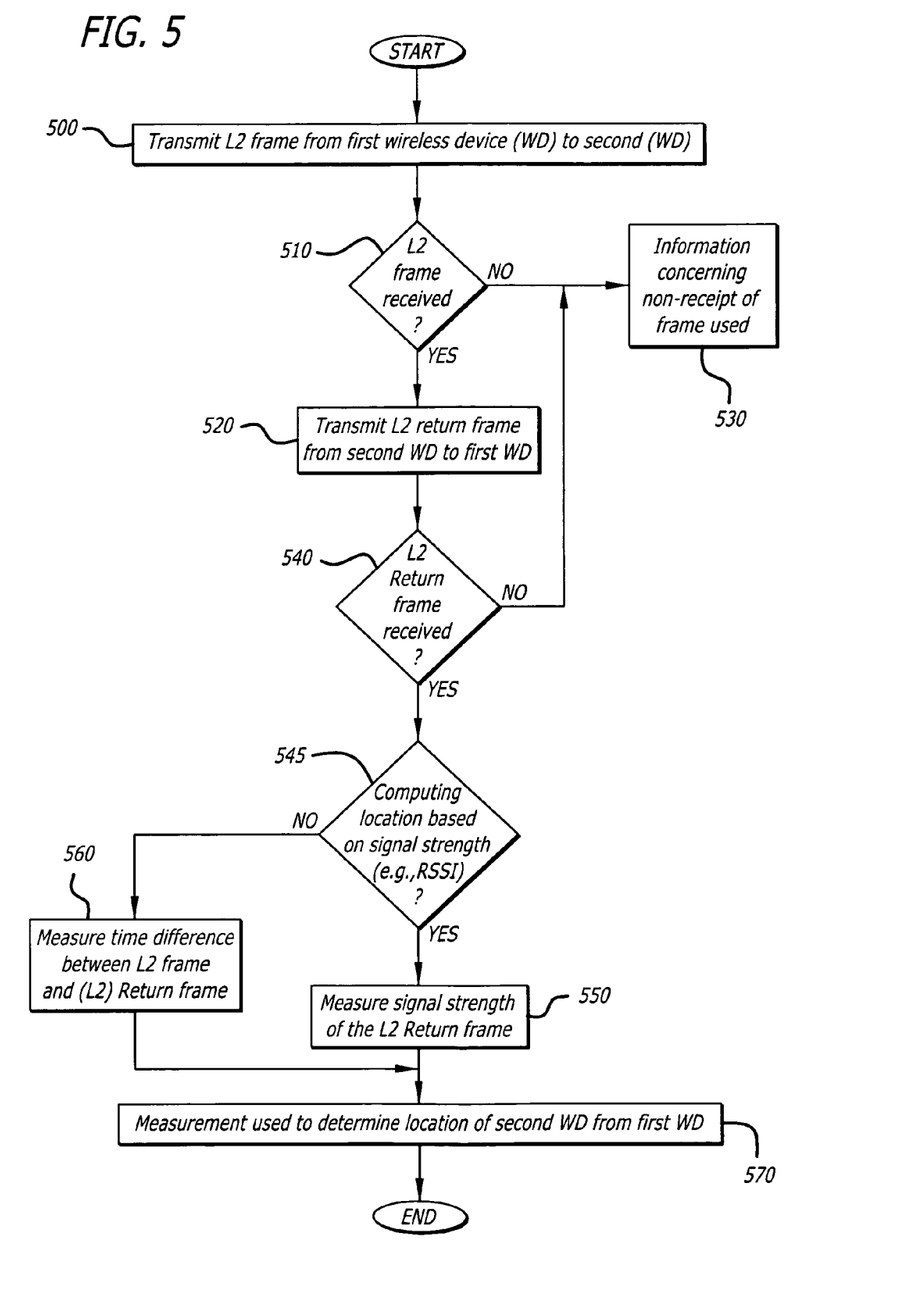
FIG. 5 is an exemplary flowchart illustrating the operations performed by the wireless device transmitting the L2 frame for location estimation.

Link monitoring can be used to track the location of a wireless device. As shown in FIG. 5, an exemplary flowchart of the location tracking operation is shown. To commence link monitoring, a first wireless device (WD) transmits a L2 frame to a second wireless device (block 500). The purpose of the L2 frame is to cause the second wireless device to transmit a frame in response to receiving the L2 frame. For instance, the L2 frame may be a NULL-Data frame.

Upon receiving the L2 frame, within a prescribed time period without error (indicated by the successful FCS validation), the second wireless device transmits a (L2) Return frame to the first wireless device (blocks 510 and 520). Otherwise, second wireless device does not provide a return frame, and thus, the first wireless device now is aware that the second wireless device either (i) failed to receive the L2 frame or (ii) received the L2 frame with errors (block 530). It is also possible that the ACK frame was transmitted by the second wireless device, but did not reach the first wireless device.

If the Return frame is received, the first wireless device may be adapted to measure the signal strength (blocks 540, 545 and 550). The signal strength of the Return frame can be used to determine the proximity of the second wireless device from the first wireless device. Alternatively, if the return frame is received, the first wireless device may be adapted to measure a time difference between transmission of the L2 frame and receipt of the Return frame (blocks 545 and 560). This signal propagation delay can be used to determine the proximity of the second wireless device from the first wireless device. Despite the technique used, the measurements conducted for the Return frame are used to determine the location of the first wireless device from the second wireless device (block 570).

B. Antenna Connectivity

Figure 6:
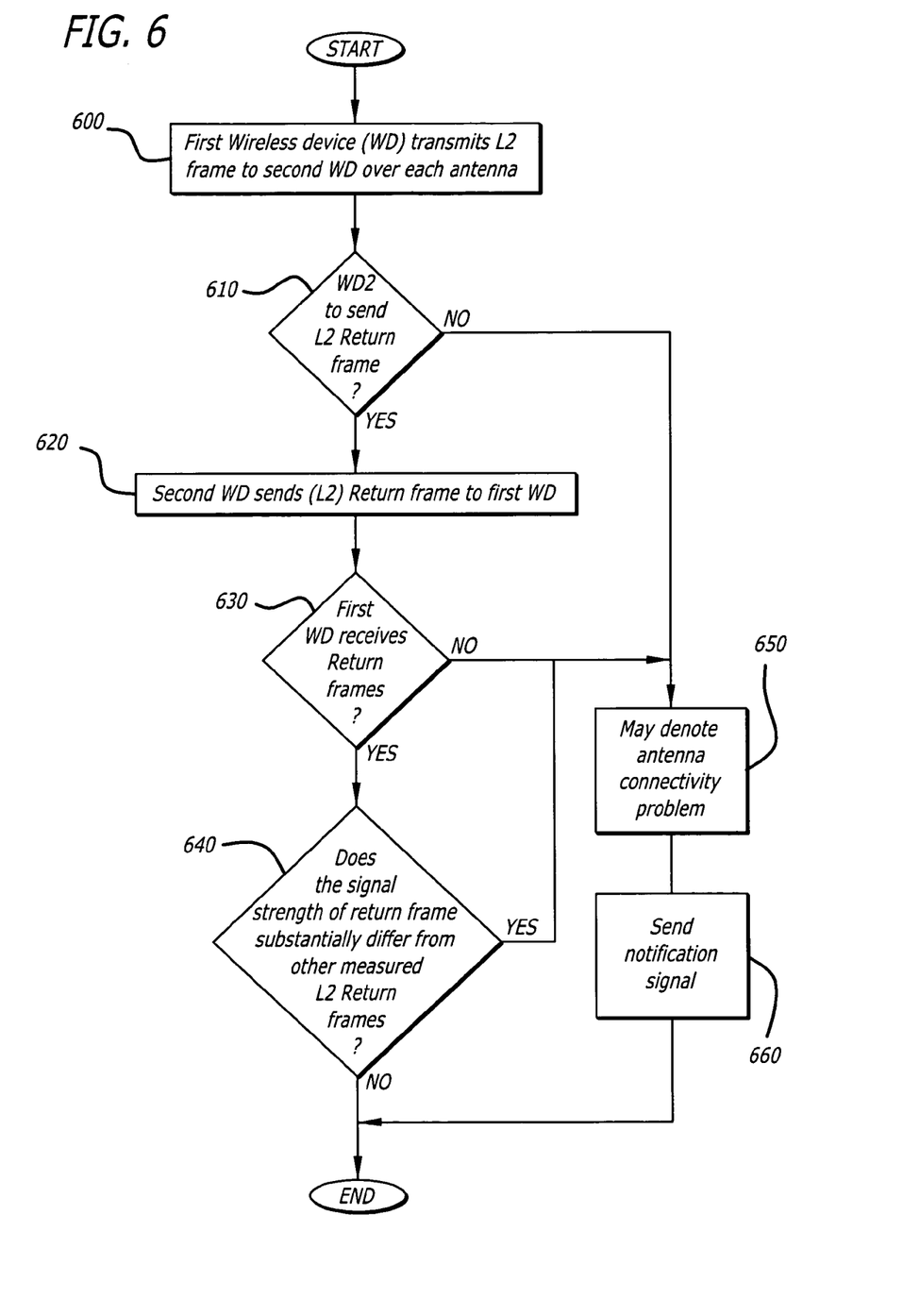
FIG. 6 is an exemplary flowchart illustrating the operations performed by the wireless device transmitting the L2 frame in order to determine antenna connectivity.

Link monitoring can be used to determine antenna connectivity by transmitting frames from all antennas associated with a first wireless device and comparing signal strength of return frames if received. As shown in FIG. 6, an exemplary flowchart for determining antenna connectivity is shown. To commence the antenna connectivity analysis, a first wireless device transmits a L2 frame to a second wireless device via each antenna (block 600). This transmission may involve the first wireless device repeatedly transmitting a L2 frame over each antenna of the first wireless device concurrently or in succession.

In response to receiving the L2 frame transmitted via a first antenna, within a prescribed time period and upon successful receipt of the L2 frame, the second wireless device sends a L2 Return frame to the first wireless device (blocks 610 and 620). Otherwise, the second wireless device does not send the Return frame, and thus, the first wireless device now is aware that the second wireless device may not have received the L2 frame (block 630). If the first wireless device fails to receive the Return frame associated with one of the remaining antennas or the signal strengths of the Return frames for any of these antenna is significantly different, this information could denote that antenna connectivity problems (blocks 640 and 650). As a result, a notification signal may be generated to request the user to investigate the antenna connections (block 660).

C. Link Quality

Link monitoring can be used to determine link quality by transmitting frames at different transmission rates and determining whether such frames are properly received. For instance, the IEEE 802.11g standard supports twelve transmission rates. Normally, the transmission rate over a wireless link between two wireless devices is selected based on the amount of data lost during transmissions. For instance, if the percentage of data loss is above a predetermined threshold, the current transmission (TX) rate supported by the wireless link is proactively reduced. If there is no data loss, the current TX rate may be increased and monitored. An application of the invention is desired to determine an optimal transmission rate without loss of valuable data.

Figure 7:
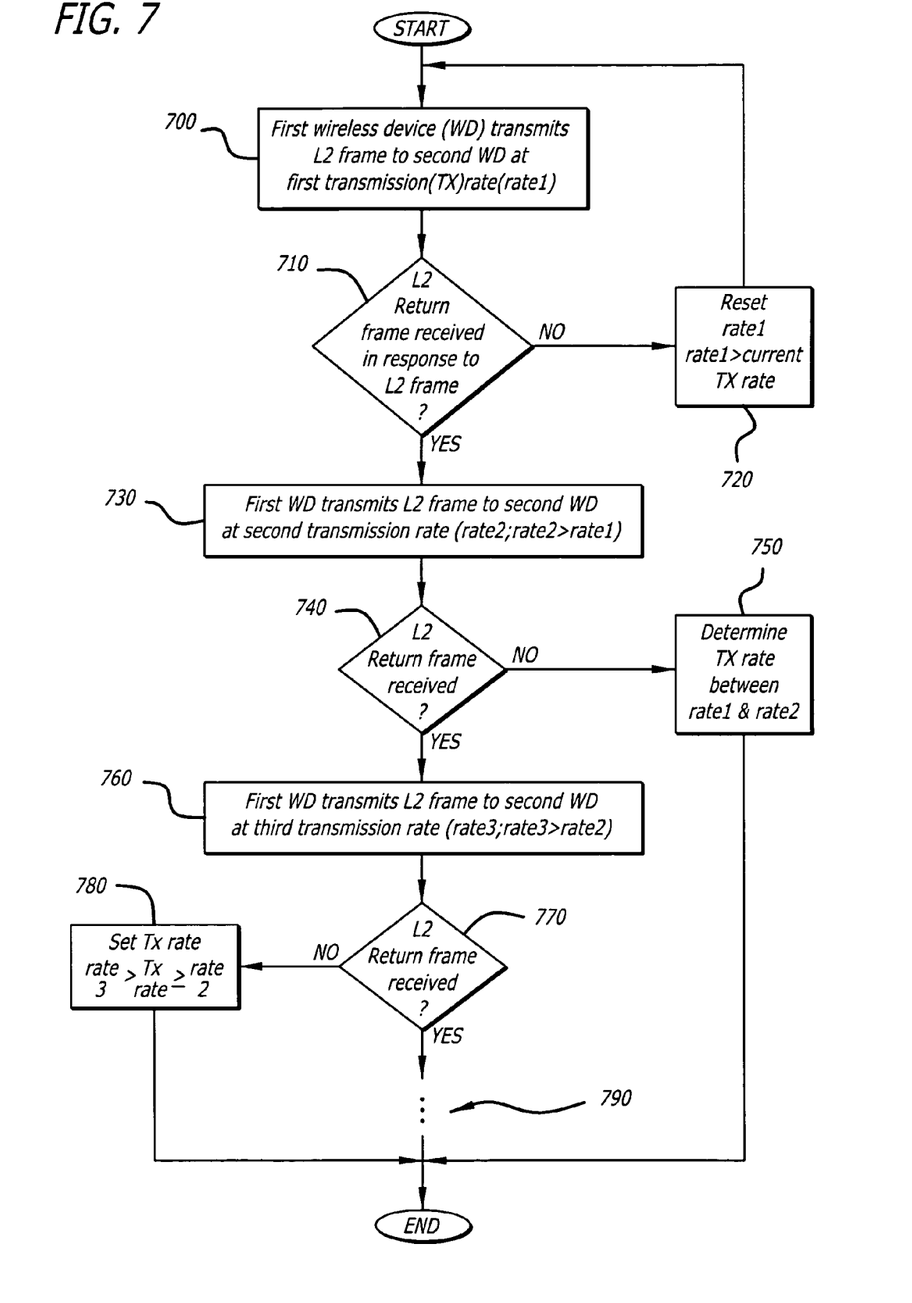
FIG. 7 is an exemplary flowchart illustrating the operations performed by the wireless device transmitting the L2 frame in order to determine link quality.

As shown in FIG. 7, an exemplary flowchart for determining link quality is shown. Herein, a first wireless device (WD) transmits a L2 frame to a second wireless device (WD) at a first transmission rate (block 700). The first transmission rate (rate 1) may be greater than the current TX rate supported by a wireless link between the first and second wireless devices.

If the first wireless device fails to receive a frame in response to the L2 frame (e.g., L2 Return frame such as an ACK frame), the first wireless device may set the transmission rate to another rate (block 720). For instance, the TX rate may be set to the current TX rate or a rate that falls between the current TX rate and the first transmission rate identified above.

In response to receiving the L2 Return frame, which indicates that the second wireless device has properly received the L2 frame, the first wireless device transmits a L2 frame at a second transmission rate "rate 2" (blocks 710 and 730). The second transmission rate (rate 2) would be greater than the first transmission rate (rate 1).

If the first wireless device receives a L2 Return frame, the first wireless device now transmits a L2 frame at a third transmission rate (rate 3) that is greater than the second transmission rate (blocks 740 and 760). This process is continued as necessary with incremental rate increases and the determination whether communications can be supported at this transmission rate.

However, if the L2 Return frame is not received within a prescribed time period, the first wireless device determines that second transmission rate cannot be currently supported by the wireless link, and thus, either selects the first transmission rate (rate 1) or conducts further link quality measurements for one or more transmission rates between the first and second transmission rates (blocks 740 and 750).

Similarly, if the first wireless device determines that the third transmission rate cannot be currently supported, the second transmission rate (rate 2) is selected or further link quality measurements are conducted between the second and third transmission rates (blocks 770 and 780). This process continues through the transmission of L2 frames to gather information until a TX rate is selected.

D. Interference Mitigation

Link monitoring can be used to mitigate interface by transmitting L2 frames at different transmit (TX) powers and determining whether L2 Return frames are received. If L2 Return frames are received for transmissions at a reduced TX power level, this power level is selected because transmissions at this reduced TX power level mitigate the chances of signal interference with other wireless devices.

Figure 8:
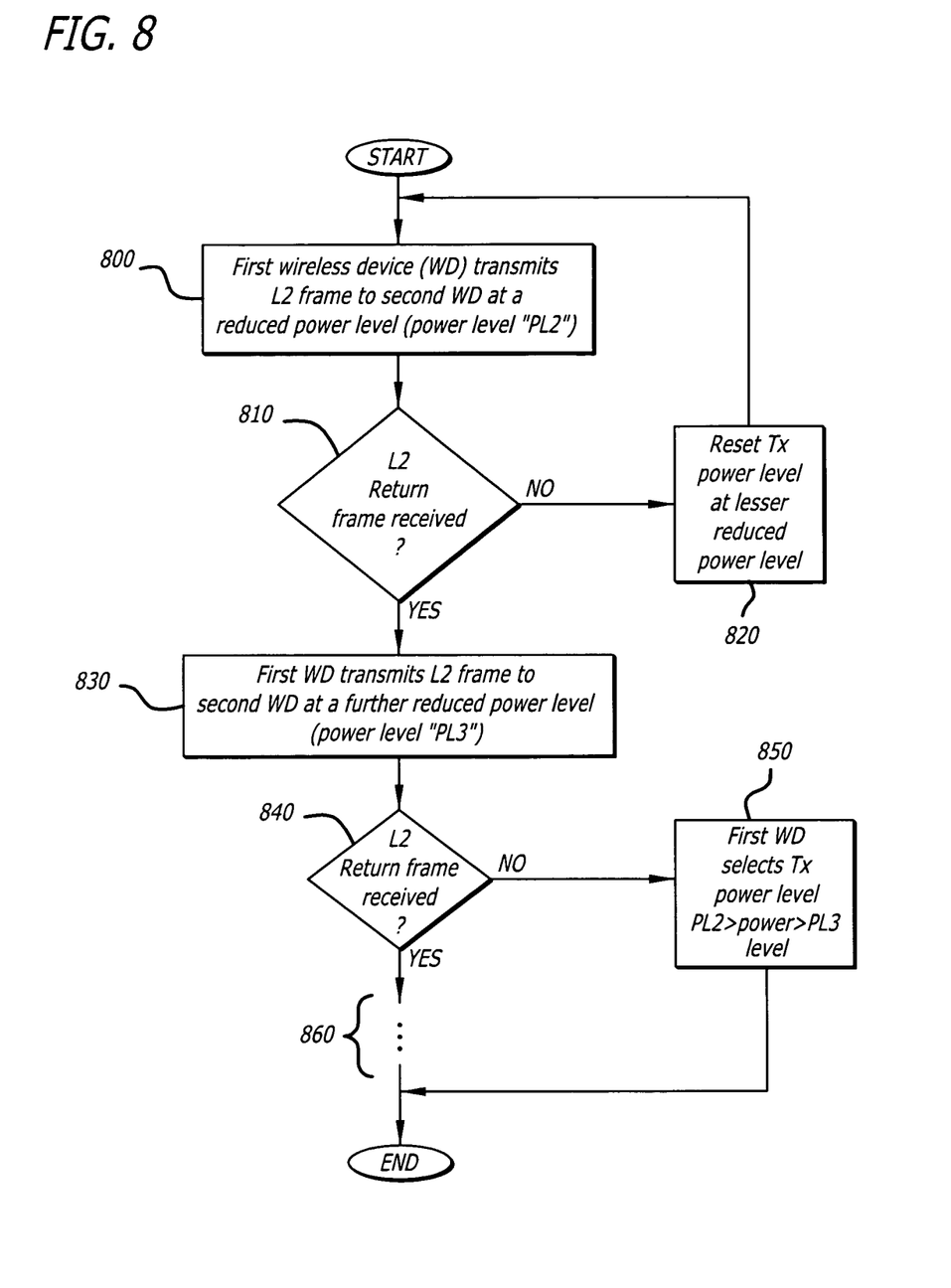
FIG. 8 is an exemplary flowchart illustrating the operations performed by the wireless device transmitting the L2 frame in order to perform interference mitigation.

As shown in FIG. 8, an exemplary flowchart by using directed L2 frames for mitigating interference is shown. For instance, the first wireless device is currently transmitting frames at a first power level such as 20 decibels (dB) for example. In order to mitigate interference, the first wireless device reduces its TX power level to a second power level (e.g., 17 dB) that is less than the first power level. Thereafter, the first wireless device transmits a L2 frame to the second wireless device over a wireless link (block 800).

In response to receiving a frame in response to the L2 frame (e.g., a L2 Return frame such as an ACK frame), which indicates that the second wireless device properly received the L2 frame, the first wireless device has now be identified that current communications with the second wireless device can be accomplished at the second power level (block 810). Otherwise, the power level is increased to a level closer the first power level (block 820).

Thereafter, the first wireless device can further reduce the TX power level to a third power level (e.g., 14 dB) that is less than the second power level and transmit another L2 frame (blocks 830). If an L2 Return frame is received (block 840), the same reduction in TX power may be performed as set forth at 860. However, if the L2 Return frame is not received within a prescribed time period, the first wireless device determines that third power level is insufficient to support communications over the wireless link, and thus, the first wireless device either selects the second power level or conducts further TX power measurements to select a power level between the second and third power levels (block 850).

E. L2 Ping Functionality

Link monitoring can be used as a L2 "ping" mechanism so that a first wireless device can determine whether a specific MAC address for a second wireless device is accessible. The second wireless device does not need to be associated with the first wireless device. In contrast with conventional ping mechanisms that are designed to troubleshoot problems with Internet connections, embodiments of the invention may be directed toward troubleshooting MAC layer connectivity problems.

Figure 9:
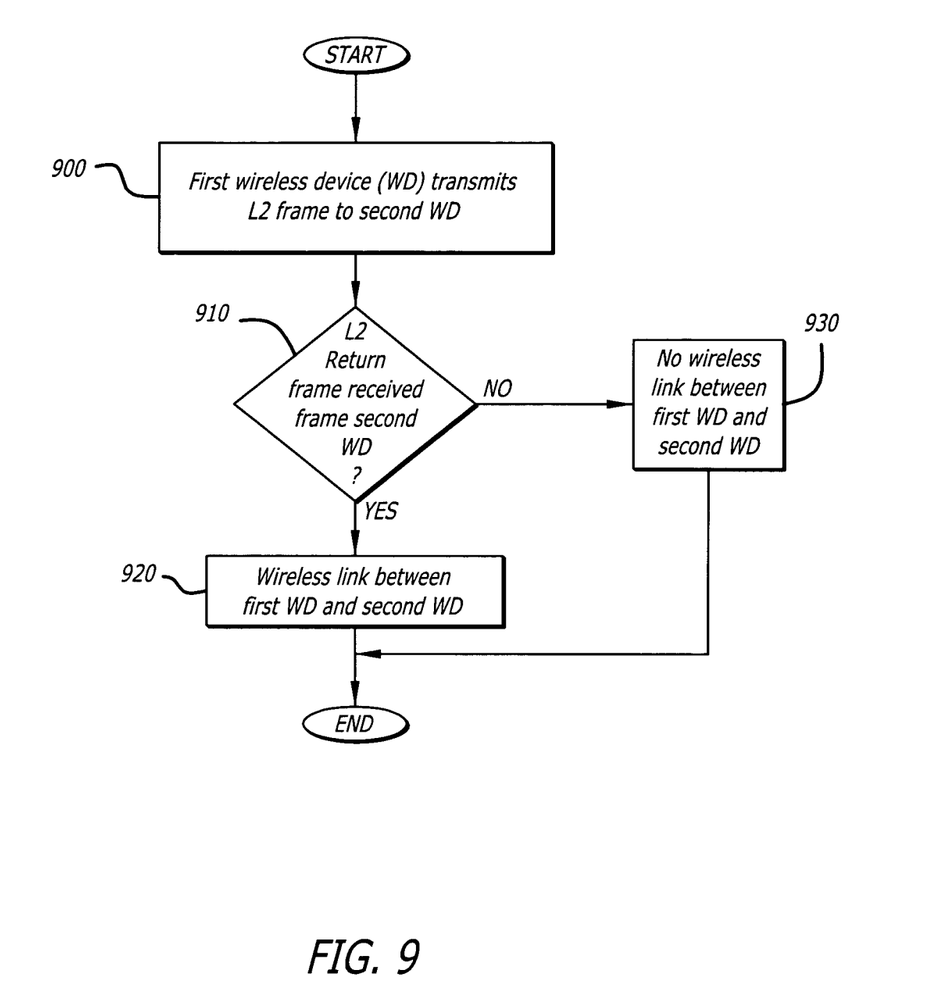
FIG. 9 is an exemplary flowchart illustrating the operations performed by the wireless device transmitting the L2 frame to operate as a L2 ping mechanism.

As shown in FIG. 9, an exemplary flowchart of a L2 ping mechanism being applied as an embodiment of the invention is shown. Herein, a first wireless device transmits a L2 frame to a second wireless device (block 900). In other words, if the first wireless device receives a frame from the second wireless device in response to the L2 frame (e.g., ACK frame) as shown in blocks 910 and 920, the first wireless device has effectively identified that a wireless link between the first and second wireless devices remains intact or can be established. Otherwise, no wireless link is currently in place or may not be established (block 930).

F. Assisting System Functionality

Link monitoring can be used as to assist in the control of system functions such as age-out and roaming by providing a mechanism where a first wireless device can quickly determine the status of a second wireless device, where the second wireless device may not be actively transmitting data.

For instance, WLANs may be adapted with low-power devices that transmit very infrequently. This poses a problem for many wireless devices within the WLAN concerning "age-out," which is a destructive process where information concerning one or more wireless devices that have not been transmitting for a prolonged period of time is deleted. In accordance with WLAN communication standards, when used correctly, "Age-out" prevents wireless devices from indefinitely storing information, and thus, a lesser amount of internal memory is needed by the wireless device.

Similarly, "Roaming" is a condition where the second wireless device discontinues communications with the first wireless device. In some situations, the second wireless device disassociates with the first wireless device and re-associates with a different wireless device. However, there are many conditions where the second wireless device merely stops transmission without initiating any disassociation requests. For these conditions, the first wireless device is unsure whether the second wireless device is still part of the WLAN or not.

Figure 10:
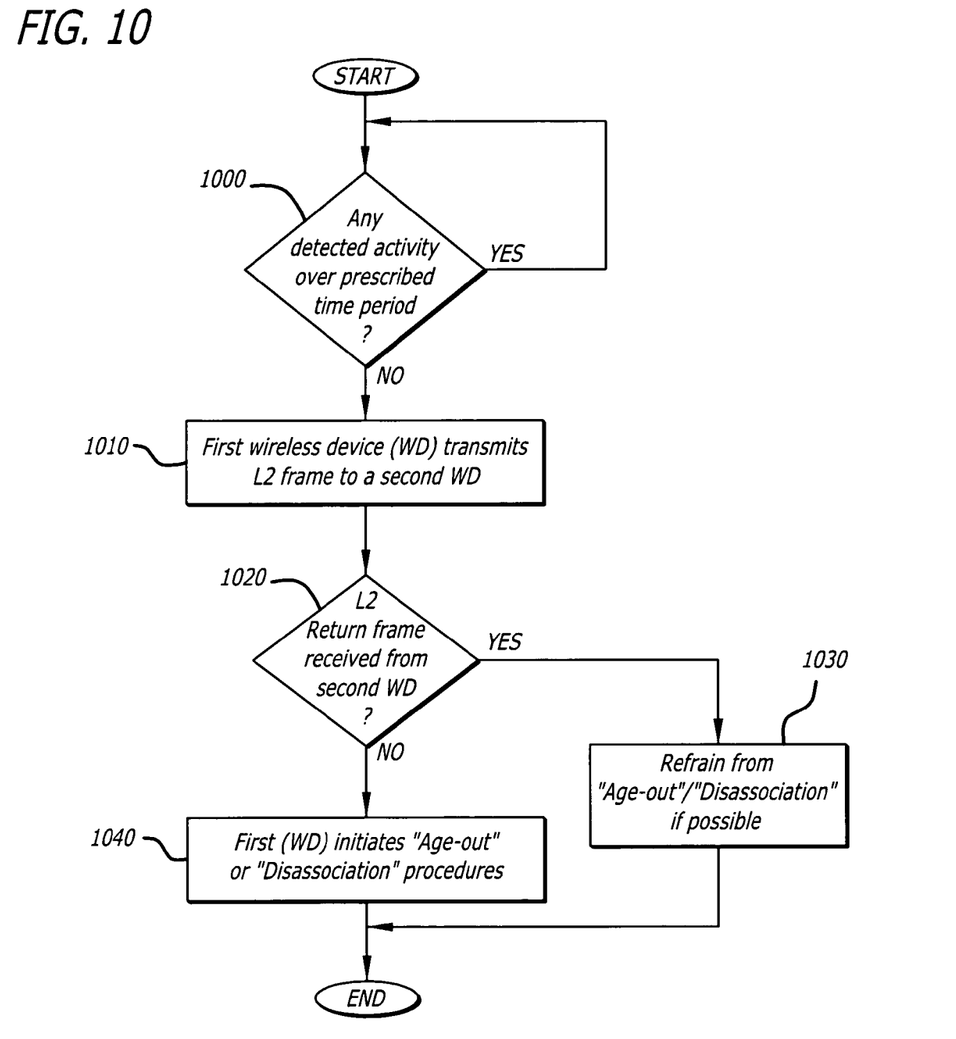
FIG. 10 is an exemplary flowchart illustrating the operations performed by the wireless device transmitting the L2 frame in order to perform age-out and roaming operations to determine the status of a device.

As shown in FIG. 10, an exemplary flowchart of an embodiment of the invention being used for Age-out and roaming control is shown. Herein, upon detection that a second wireless device has not sent any transmissions detected by a first wireless device for a prolonged period of time, first wireless device transmits a L2 frame to a second wireless device (blocks 1000 and 1010). If the first wireless device receives a frame from the second wireless device in response to the L2 frame (e.g., ACK frame), the first wireless device has effectively identified that a wireless link between the first and second wireless devices remains intact or can be established (blocks 1020 and 1030). Otherwise, the first wireless device may initiate an "age-out" or disassociation process in order to free up resources (block 1040).

G. Antenna Orientation

Figure 11:
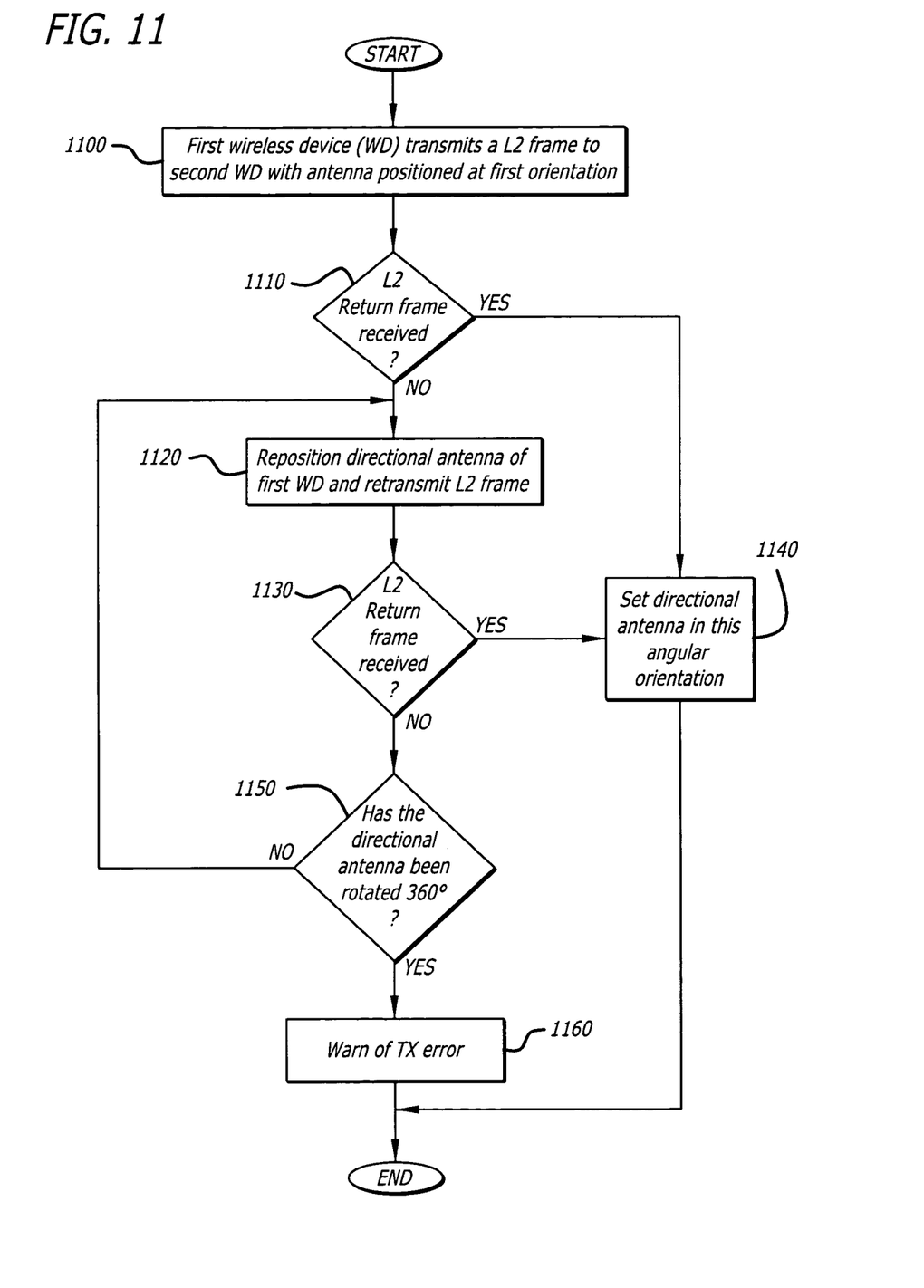
FIG. 11 is an exemplary flowchart illustrating the operations performed by the wireless device transmitting the L2 frame in order to orient directional antennas.

Link monitoring can be used to orient a directional antenna of a wireless device. As shown in FIG. 11, an exemplary flowchart for determining antenna orientation of a wireless device is shown. Initiating, the wireless device transmits a L2 frame to a second wireless device that is known to be operational (block 1100). For this transmission, the directional antenna of the wireless device is positioned in a first orientation. If the wireless device fails to receive an L2 Return frame, the directional antenna is repositioned in a second orientation that differs from the first orientation (blocks 1110 and 1120).

This process is performed iteratively, until a L2 Return frame is received with sufficient signal strength or the directional antenna has been repositioned in orientations that span the entire coverage area such as 360° orientation (blocks 1130 and 1150). If no L2 Return frame is received or the signal strength is insufficient, a warning is provided to the user regarding the inability of the first wireless device to reliably communicate with the second wireless device (block 1160).

If the L2 Return frame is received at any orientation of the directional antenna with sufficient signal strength, the orientation is saved along with the signal strength and used for subsequent communications with the second wireless device (block 1140).

While the invention has been described in terms of several embodiments, the invention should not be limited to only those embodiments described, but can be practiced with modification and alteration within the spirit and scope of the appended claims. The description is thus to be regarded as illustrative instead of limiting.

What is claimed is:

1. A non-transitory computer readable storage medium comprising instructions which, when executed by one or more hardware processors, is configured to perform operations comprising:
   transmitting a data frame from an access point to a wireless device, the data frame is a unicast communication that is initiated by the access point and is not responsive to any prior frames received by the access point from the wireless device;
   wherein the data frame is sent from the access point to the wireless device when the wireless device is not associated with the access point;
   wherein the data frame is addressed to the wireless device;
   wherein the data frame reaches an Open Systems Interconnection (OSI) Layer 2 interface of the wireless device;
   receiving an Acknowledgement (ACK) frame, as defined by Institute of Electrical and Electronics Engineers (IEEE) 802.11 standards, by the access point from the wireless device, that is not associated with the access point;
   wherein the ACK frame is received in response to the data frame;
   wherein the ACK frame includes a Media Access Control (MAC) header and a Frame Check Sequence (FCS) and does not include a frame body for data transfer;
   wherein the ACK frame traverses the OSI Layer 2 interface of the wireless device prior to the access point receiving the ACK frame from the wireless device;
   determining one or more characteristics of the wireless device, that is not associated with the access point, based on the ACK frame that is received by the access point from the wireless device;
   wherein the one or more characteristics comprises one or more of:
   a location of the wireless device;
   an antenna connectivity for the wireless device;
   an antenna connectivity for the access point;
   a direction from the access point toward the wireless device;
   an altered transmission rate that is different than a transmission rate used prior to transmission of the data frame that can be supported for communications between the access point and the wireless device;
   a distance of the wireless device from the access point.

2. The medium of claim 1, wherein the ACK frame is used to track the location of the wireless device.

3. The medium of claim 1, wherein the ACK frame is used to check the antenna connectivity for the wireless device.

4. The medium of claim 1, wherein the ACK frame is used to select an orientation for a directional antenna of the wireless device.

5. The medium of claim 1, wherein the data frame is a Null-Data frame in accordance with an Institute of Electrical and Electronic Engineers 802.11 standard.

6. The medium of claim 1, wherein the access point repositions an orientation of a directional antenna of the access point based on the ACK frame.

7. The medium of claim 1, further comprising:
   based on the ACK frame, determining that the altered transmission rate is different than the transmission rate used prior to transmission of the data frame can be supported for the communications between the access point and the wireless device that transmitted the ACK frame.

8. The medium of claim 1, wherein the access point is configured to estimate the distance of the wireless device to the access point based on a time difference between transmission of the data frame and receipt of the ACK frame.

9. A non-transitory computer readable storage medium comprising instructions which, when executed by one or more hardware processors, is configured to perform operations comprising:
   transmitting an Open Systems Interconnection (OSI) Layer 2 (L2) frame from an access point to a wireless device, the data frame is a unicast communication that is initiated by the access point and is not responsive to any prior frames received by the access point from the wireless device;
   wherein the L2 frame is sent from the access point to the wireless device when the wireless device is not associated with the access point;
   wherein the L2 frame is addressed to the wireless device;
   receiving an OSI L2 Acknowledgement (ACK) frame, as defined by Institute of Electrical and Electronics Engineers (IEEE) 802.11 standards, by the access point from the wireless device, that is not associated with the access point;
   wherein the ACK frame is received in response to the L2 frame;
   wherein the ACK frame includes a Media Access Control (MAC) header and a Frame Check Sequence (FCS) and does not include a frame body for data transfer;
   determining one or more characteristics of the wireless device, that is not associated with the access point, based on the ACK frame that is received by the access point from the wireless device;
   wherein the one or more characteristics comprises one or more of:
      a location of the wireless device;
      an antenna connectivity for the wireless device;
      an antenna connectivity for the access point;
      a direction from the access point toward the wireless device;
      an altered transmission rate is different than a transmission rate used prior to transmission of the L2 frame that can be supported for communications between the access point and the wireless device;
      a distance of the wireless device from the access point.

10. The computer readable storage medium of claim 9, wherein the ACK frame is used to track the location of the wireless device.

11. The computer readable storage medium of claim 9, wherein the ACK frame is used to check the antenna connectivity for the wireless device.

12. The computer readable storage medium of claim 9, wherein the ACK frame is used to select an orientation for a directional antenna of the wireless device.

13. The computer readable storage medium of claim 9, wherein the L2 frame is a Null-Data frame in accordance with an Institute of Electrical and Electronic Engineers 802.11 standard.

14. The computer readable storage medium of claim 9, wherein the access point repositions an orientation of a directional antenna of the access point based on the ACK frame.

15. The computer readable storage medium of claim 9, further comprising:
   based on the ACK frame, determining that an altered transmission rate is different than a transmission rate used prior to transmission of the L2 frame can be supported for communications between the access point and the wireless device that transmitted the ACK frame.

16. The computer readable storage medium of claim 9, wherein the access point is configured to estimate a distance of the wireless device to the access point based on a time difference between transmission of the L2 frame and receipt of the ACK frame.

17. An access point comprising:
   one or more hardware processors;
   the access point configured for:
   transmitting a data frame from the access point to a wireless device, the data frame is a unicast communication that is initiated by the access point and is not responsive to any prior frames received by the access point from the wireless device;
   wherein the data frame is sent from the access point to the wireless device when the wireless device is not associated with the access point;
   wherein the data frame is addressed to the wireless device;
   wherein the data frame reaches an Open Systems Interconnection (OSI) Layer 2 interface of the wireless device;
   receiving an Acknowledgement (ACK) frame, as defined by Institute of Electrical and Electronics Engineers (IEEE) 802.11 standards, by the access point from the wireless device, that is not associated with the access point;
   wherein the ACK frame is received in response to the data frame;
   wherein the ACK frame includes a Media Access Control (MAC) header and a Frame Check Sequence (FCS) and does not include a frame body for data transfer;
   wherein the ACK frame traverses the OSI Layer 2 interface of the wireless device prior to the access point receiving the ACK frame from the wireless device;
   determining one or more characteristics of the wireless device, that is not associated with the access point, based on the ACK frame that is received by the access point from the wireless device;
   wherein the one or more characteristics comprises one or more of:
      a location of the wireless device;
      an antenna connectivity for the wireless device;
      an antenna connectivity for the access point;
      a direction from the access point toward the wireless device;
      an altered transmission rate is different than a transmission rate used prior to transmission of the data frame that can be supported for communications between the access point and the wireless device;
      a distance of the wireless device from the access point.

18. The access point of claim 17, wherein the ACK frame is used to track the location of the wireless device.

19. The access point of claim 17, wherein the ACK frame is used to check the antenna connectivity for the wireless device.

20. The access point of claim 17, wherein the ACK frame is used to select an orientation for a directional antenna of the wireless device.

21. The access point of claim 17, wherein the data frame is a Null-Data frame in accordance with an Institute of Electrical and Electronic Engineers 802.11 standard.

22. The access point of claim 17, wherein the access point repositions an orientation of a directional antenna of the access point based on the ACK frame.

23. The access point of claim 17, further comprising:
   based on the ACK frame, determining that the altered transmission rate is different than the transmission rate used prior to transmission of the data frame can be supported for the communications between the access point and the wireless device that transmitted the ACK frame.

24. The access point of claim 17, wherein the access point is configured to estimate the distance of the wireless device to the access point based on a time difference between transmission of the data frame and receipt of the ACK frame.

25. An access point comprising:
one or more hardware processors;
the access point configured for:
transmitting an Open Systems Interconnection (OSI) Layer 2 (L2) frame from an access point to a wireless device, the data frame is a unicast communication that is initiated by the access point and is not responsive to any prior frames received by the access point from the wireless device;
wherein the L2 frame is sent from the access point to the wireless device when the wireless device is not associated with the access point;
wherein the L2 frame is addressed to the wireless device;
receiving an OSI L2 Acknowledgement (ACK) frame, as defined by Institute of Electrical and Electronics Engineers (IEEE) 802.11 standards, by the access point from the wireless device, that is not associated with the access point;
wherein the ACK frame is received in response to the L2 frame;
wherein the ACK frame includes a Media Access Control (MAC) header and a Frame Check Sequence (FCS) and does not include a frame body for data transfer;
determining one or more characteristics of the wireless device, that is not associated with the access point, based on the ACK frame that is received by the access point from the wireless device;
wherein the one or more characteristics comprises one or more of:
a location of the wireless device;
an antenna connectivity for the wireless device;
an antenna connectivity for the access point;
a direction from the access point toward the wireless device;
an altered transmission rate that is different than a transmission rate used prior to transmission of the L2 frame that can be supported for communications between the access point and the wireless device;
a distance of the wireless device from the access point.

26. The access point of claim 25, wherein the ACK frame is used to track the location of the wireless device.

27. The access point of claim 25, wherein the ACK frame is used to check the antenna connectivity for the wireless device.

28. The access point of claim 25, wherein the ACK frame is used to check the antenna connectivity for the access point.

29. The access point of claim 25, wherein the ACK frame is used to select an orientation for a directional antenna of the wireless device.

30. The access point of claim 25, wherein the L2 frame is a Null-Data frame in accordance with an Institute of Electrical and Electronic Engineers 802.11 standard.

31. The access point of claim 25, wherein the access point repositions an orientation of a directional antenna of the access point based on the ACK frame.

32. The access point of claim 25, further comprising:
based on the ACK frame, determining that the altered transmission rate is different than the transmission rate used prior to transmission of the L2 frame can be supported for the communications between the access point and the wireless device that transmitted the ACK frame.

33. The access point of claim 25, wherein the access point is configured to estimate a distance of the wireless device to the access point based on a time difference between transmission of the L2 frame and receipt of the ACK frame.

* * * * *